Nov. 18, 1969  J. K. SEDAM  3,479,069

CONNECTOR ASSEMBLY

Filed Oct. 20, 1967

INVENTOR.
JASON K. SEDAM

BY
*Lindsey, Prutzman and Hayes*
ATTORNEYS

United States Patent Office 3,479,069
Patented Nov. 18, 1969

3,479,069
CONNECTOR ASSEMBLY
Jason K. Sedam, Atlanta, Ga., assignor to Amseco Corporation, Long Island City, N.Y., a corporation of New York
Filed Oct. 20, 1967, Ser. No. 676,845
Int. Cl. F16l 37/08, 19/00
U.S. Cl. 285—364                                    4 Claims

ABSTRACT OF THE DISCLOSURE

An assembly including a pair of radially flanged fittings and a snap-on spring clip for maintaining the same in coupled engagement, the spring clip being formed of a single strap of resilient sheet material precisely slotted to form a pair of integrally joined retaining arms having spaced opposed inner edges for effecting edge contact engagement with exposed faces of the flanged fittings, the arms each being of generally flat rectangular cross section dimensioned to extend axially of the fittings a sufficient distance to effectively resist high intensity longitudinal stresses.

---

This invention generally relates to high pressure fluid couplings and particularly concerns a connector assembly for maintaining a pair of fittings in detachable assembled relation.

A primary object of this invention is to provide an improved connector assembly for retaining a pair of fittings in coupled relation and which is capable of providing significantly increased resistance to intense axial forces tending to break the coupling between the fittings.

Another object of this invention is to provide an improved connector assembly which is economically manufactured and of lightweight but rugged, compact construction.

A further object of this invention is to provide an improved connector assembly capable of rotating relative to the fittings even at elevated pressures while continuously maintaining a fluid-tight connection between the fittings.

Still another object of this invention is to provide an improved connector assembly of the above described type which is quick and easy to assemble and disassemble in a minimal amount of time.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

SUMMARY

The connector assembly of this invention comprises a pair of flanged fittings and a one piece snap-on spring clip formed of a single strap of resilient sheet material. The clip has a pair of arms integrally joined at their opposite ends and at an intermediate projecting portion of the arms such that the clip may be conveniently snapped over the flanges and onto the fittings, and the arms are dimensioned to extend in opposite axial directions from the flanges of the fittings a distance greater than the thickness of the arms to effect significantly increased resistance to longitudinal stresses and positively couple the fittings.

Figure 1:
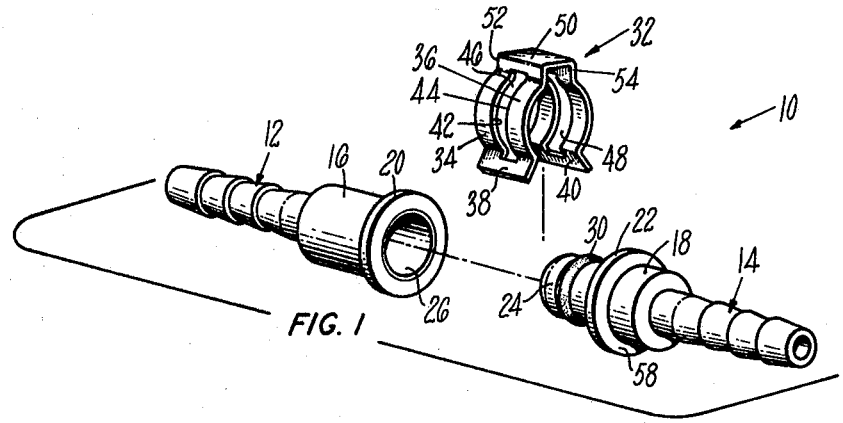
FIG. 1 is an isometric view showing a connector assembly of this invention with the components partially disassembled.
Figure 2:
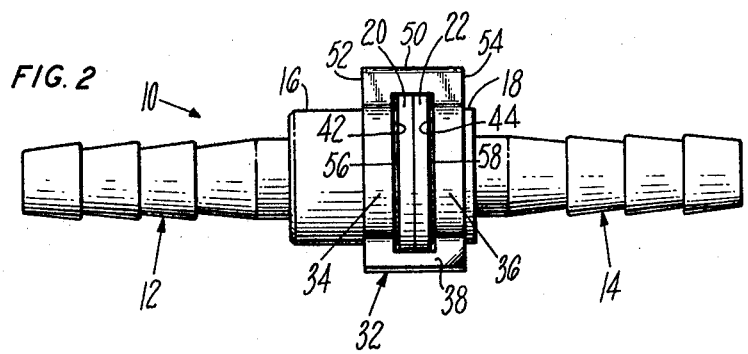
FIG. 2 is an enlarged front view of the connector assembly of FIG. 1 with the components shown maintained in assembled relation by a spring clip.
Figure 3:
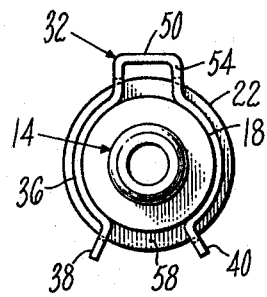
FIG. 3 is a right hand end view of the connector assembly of FIG. 2.
Figure 4:
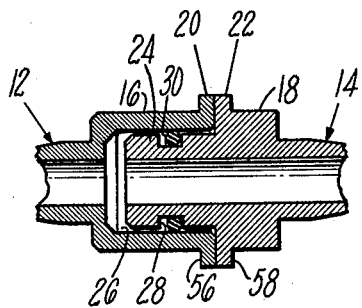
FIG. 4 is a longitudinal section view, partly broken away, of a central portion of the connector assembly of FIG. 2 with the clip removed.

Referring now to the drawing in detail wherein a preferred embodiment of this invention is illustrated, a connector assembly 10 is shown for illustrative purposes including a pair of tubular serrated hose fittings 12 and 14 having end portions 16 and 18 respectively provided with enlarged radially extending flanges 20 and 22.

In the specific illustrated embodiment of this invention, the right hand fitting 14 is shown having a reduced stem 24 suitably dimensioned to be inserted in close-fitting relation within a cylindrical chamber 26 formed in the mating end of fitting 12. An annular groove 28 is shown formed around the stem 24 for receiving a suitable seal such as the illustrated O-ring seal 30 conventionally formed of an elastomeric material. It is to be understood that any conventional seal may be utilized to provide perimeter sealing engagement between the stem 24 and the wall of the chamber 26 so as to effect a fluid-tight connection between the fittings 12, 14 upon their being coaxially telescoped with their radial flanges 20, 22 in abutting engagement whereby any tendency toward leakage between the fittings 12, 14 is virtually eliminated to permit their use, e.g., in conducting comestible liquids at high pressures.

To maintain the fittings 12, 14 in coupled relation, e.g., for conducting high pressure fluid between adjacent hose portions, not shown, a snap-on spring clip 32 is provided for the connector assembly 10 in isolated relation to the seal 30 to effectively resist high intensity axial forces tending to force the fittings 12, 14 apart while yet ensuring that no holding forces exerted by the spring clip 32 will be applied to the seal 30.

Specifically, the clip 32 is formed of a single strap of tough resilient sheet material, preferably stainless steel, having a pair of spaced, arcuate retaining arms 34 and 36 integrally joined together at their opposite ends by a pair of tabs 38 and 40 bent to project outwardly from the arms 34, 36. The latter present opposed inner edges 42 and 44 which precisely define a pair of slots 46 and 48 on opposite sides of the clip 32. The slots 46 and 48 extend from the tabs 38, 40 to a bridge 50 integrally joined to a pair of projecting webs 52 and 54 respectively formed on the arms 34 and 36 midway between their opposite ends to project outwardly of the flanges 20, 22 and provide a resilient hinge spanning the arms 34, 36 and facilitating attachment and removal of the clip 32 relative to the fittings 12, 14.

To assemble the connector assembly 10, the seal 30 is seated on the stem 24 in the annular groove 28, and fitting 14 is coaxially inserted into chamber 26 of fitting 12 to an extent limited by abutting engagement of the radial flanges 20, 22. The clip 32 is then pressed onto the fittings 12, 14 with the slots 46, 48 aligned with the flanges 20, 22 until the clip 32 snaps into place with the flanges 20, 22 projecting through the slots 46, 48 on both sides of the bridge 50 disposed radially outwardly of the flanges 20, 22.

By virtue of the above described structure, the arms 34, 36 of generally flat rectangular cross section are each dimensioned to extend in opposite axial directions from the flanges 20, 22 a preselected axial distance greater than the thickness of the arm whereby the spaced opposed inner edges 42, 44 of each of the slots 46, 48 provide edge contact engagement with exposed faces 56, 58 of the flanges 20, 22 for effectively resisting high intensity longitudinal stresses in opposite axial directions and thereby positively maintaining the fittings 12, 14 in coupled engagement. At the same time, however, no holding forces exerted by the clip 32 are applied to the seal 30 which is disposed in isolated relation thereto between the fittings 12, 14.

The above described construction assures that tensile stresses set up within the clip 32 are well distributed due to the finger tabs 38, 40 interconnecting the ends of the arms 34, 36 and the bridge 50 joining their webs 52, 54. Moreover, it is to be noted that the opposite joined ends of the arms 34, 36 are desirably spaced apart an angular distance less than a semicircle. Such a feature provides an effective holding force and even if the clip 32 were angularly displaced relative to the fittings 12, 14 under elevated pressures, no fluid leakage will occur.

To disassemble the connector assembly 10, the radially projecting finger tabs 38, 40 provide ready purchase for removing the clip 32 from the fittings 12, 14 while the above described web and bridge hinge connection between the arms 34, 36 facilitates their expansion for reducing the spring holding force of the clip 32 to facilitate its removal and attachment to the fittings 12 and 14.

In utilizing clip 32 in applications wherein exceptionally high pressure forces are encountered, correspondingly higher spring holding forces will be required, and a clip of the above described structure is particularly suited to be removed by merely inserting an appropriate prying tool such as a screwdriver, not shown, between the flanges 20, 22 and the projecting bridge 50 to provide facile removal of the clip 32 in a significantly quick and easy manner.

A connector assembly constructed in accordance with this invention is economical to manufacture as well as being quick and easy to install and remove for coupling adjacent conduit portions of a fluid circuit, e.g., and is of compact rugged construction particularly suited to provide long reliable service under adverse environment conditions.

As will be apparent to persons skilled in the art, various modifications and adaptations of the structure above described will become readily apparent without departure from the spirit and scope of the invention.

I claim:

1. A high pressure connector assembly comprising a pair of detachably coupled fittings each having radially extending flanges in positive end-to-end abutment with exposed faces at opposite axial ends of the flanges, and a self-sustaining snap-on spring clip formed of a single strap of resilient sheet material removably mounted on the fittings, the clip including a pair of retaining arms integrally joined at their opposite ends and having spaced opposed, arcuate inner edges contained in parallel planes and extending circumferentially about the fittings for effecting edge contact engagement with the exposed faces of the flanges, the arms respectively extending in opposite axial directions from the flanges a distance greater than the thickness of the arm, the arms each having an intermediate projecting web, and the clip further including a bridge disposed radially outwardly of the flanges in spaced relation thereto and integrally joining the intermediate projecting webs of the arms whereby the arms are joined at angularly spaced intervals to effectively distribute loading forces imposed on the clip and to resist high intensity longitudinal stresses in opposite axial directions for positively maintaining the fittings in coupled engagement.

2. The assembly of clam 1 wherein the opposite joined ends of the arms are each turned radially outwardly.

3. The assembly of claim 1 wherein the opposite joined ends of the arms are spaced apart an angular distance less than a semicircle.

4. A high pressure connector assembly comprising a pair of detachably coupled fittings of tubular cross section each having radially extending flanges in positive end-to-end abutment with exposed faces at opposite axial ends of the flanges, one of the fittings including a reduced stem and the other fitting having a chamber for receiving said stem in close-fitting telescoping relation, and a self-sustaining snap-on spring clip formed of a single strap of resilient sheet material removably mounted on the fittings, the clip including a pair of retaining arms integrally joined at their opposite ends and having spaced opposed inner edges for effecting edge contact engagement with the exposed faces of the flanges, the arms respectively extending in opposite axial directions from the flanges a distance greater than the thickness of the arm, the arms each having an intermediate projecting web, the clip further including a bridge disposed radially outwardly of the flanges in spaced relation thereto and integrally joining the intermediate projecting webs of the arms whereby the arms are joined at angularly spaced intervals to effectively distribute loading forces imposed on the clip and to resist high intensity longitudinal stresses in opposite axial directions for positively maintaining the fittings in coupled engagement, and sealing means between the fittings providing a fluid-tight perimeter seal between the fittings in isolated relation to the spring clip, the fittings and the clip respectively being in angularly movable relation to each other to permit relative rotation while continuing to maintain sealing engagement between the fittings.

References Cited

UNITED STATES PATENTS

| 3,286,963 | 11/1966 | Bergman. | |
| 1,436,882 | 11/1922 | Knepper | 285—319 |
| 2,784,011 | 3/1957 | Roberts | 285—319 |

FOREIGN PATENTS

| 24,094 | 1895 | Great Britain. |
| 860,870 | 2/1961 | Great Britain. |
| 80,777 | 9/1952 | Norway. |

DAVID J. WILLIAMOWSKY, Primary Examiner

WAYNE L. SHEDD, Assistant Examiner

U.S. Cl. X.R.

285—374, 403, 420